United States Patent
Cordero et al.

(10) Patent No.: US 10,168,922 B1
(45) Date of Patent: Jan. 1, 2019

(54) VOLATILE AND NON-VOLATILE MEMORY IN A TSV MODULE

(71) Applicant: International Business Machines Corporation, Armonk, NY (US)

(72) Inventors: Edgar R. Cordero, Round Rock, TX (US); Kyu-hyoun Kim, Chappaqua, NY (US); Adam J. McPadden, Underhill, VT (US); Anuwat Saetow, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 15/138,610

(22) Filed: Apr. 26, 2016

(51) Int. Cl.
- *G06F 3/06* (2006.01)
- *G11C 11/4096* (2006.01)
- *G11C 11/406* (2006.01)
- *G11C 11/20* (2006.01)
- *G11C 14/00* (2006.01)
- *G06F 11/20* (2006.01)

(52) U.S. Cl.
CPC ............ *G06F 3/0619* (2013.01); *G06F 3/065* (2013.01); *G06F 3/0685* (2013.01); *G06F 11/2015* (2013.01); *G06F 2201/805* (2013.01)

(58) Field of Classification Search
CPC ...... G06F 3/065; G06F 3/0685; G06F 3/0619; G06F 11/2015; G06F 11/1448; G06F 11/1458; G06F 11/1456; G06F 2201/805
See application file for complete search history.

(56) References Cited

U.S. PATENT DOCUMENTS

| | | | |
|---|---|---|---|
| 6,798,008 B2 | 9/2004 | Choi | |
| 7,459,740 B2 | 12/2008 | Bhattacharyya et al. | |
| 7,944,764 B1* | 5/2011 | Qawami | G11C 11/005 365/200 |
| 8,129,833 B2 | 3/2012 | Kang et al. | |
| 8,421,237 B2* | 4/2013 | Chia | G11C 5/06 257/774 |
| 9,000,577 B2* | 4/2015 | Droege | H01L 25/0657 257/686 |
| 2005/0223157 A1 | 10/2005 | Floman et al. | |
| 2006/0004955 A1* | 1/2006 | Ware | G11C 11/406 711/106 |

(Continued)

FOREIGN PATENT DOCUMENTS

EP 2672511 12/2013

OTHER PUBLICATIONS

E.R. Cordero, et al.,"Coherency Management for Volatile and Non-Volatile Memory in a Through-Silicon Via (TSV) Module" U.S. Appl. No. 15/138,629, filed Apr. 26, 2016.

(Continued)

*Primary Examiner* — Tracy A Warren
(74) *Attorney, Agent, or Firm* — Cantor Colburn LLP

(57) ABSTRACT

An aspect includes data backup management between volatile memory and non-volatile memory in a through-silicon via module of a computer system. Data is copied data from the volatile memory to the non-volatile memory during a refresh cycle of the volatile memory. The data is written to one or more non-volatile memory cells within the non-volatile memory prior to a next refresh cycle of the volatile memory.

17 Claims, 9 Drawing Sheets

(56) References Cited

U.S. PATENT DOCUMENTS

| | | | |
|---|---|---|---|
| 2010/0110748 A1* | 5/2010 | Best | G06F 12/0638 365/51 |
| 2011/0242876 A1* | 10/2011 | Norman | G06F 13/1668 365/148 |
| 2015/0199126 A1 | 7/2015 | Jayasena et al. | |
| 2017/0220293 A1* | 8/2017 | Kim | G11C 5/06 |

OTHER PUBLICATIONS

List of IBM Patents or Patent Applications Treated as Related; Date Filed: Apr. 26, 2016, p. 1-2.

Park, et al., "Efficient Memory Management of a Hierarchical and a Hybrid Main Memory for MN-MATE Platform," PHAM Feb. 26, 2012, 10 pages.

\* cited by examiner

VOLATILE AND NON-VOLATILE MEMORY IN A TSV MODULE

BACKGROUND

The present invention relates to computer memory systems, and more specifically, to a through-silicon via (TSV) module that includes volatile and non-volatile memory.

In some computer system applications, non-volatile memory is used to backup and preserve the state of volatile memory during a power loss or interruption. Backup power supplies, such as batteries or super capacitors, are typically used to supply power needed to perform a transfer of the contents of volatile memory to non-volatile memory when primary power is lost. The backup power supplies must be sized to provide electrical power for a sufficient period of time to complete data transfer and storage processes from volatile to non-volatile memory. The use of non-volatile memory for backup purposes can also delay system restart timing, as a sufficient period of time must be allotted for the backup writing process to complete upon a power loss event before attempting to restore values from the non-volatile memory to the volatile memory when primary power is restored.

SUMMARY

According to one embodiment, a method of data backup management between volatile memory and non-volatile memory in a through-silicon via module of a computer system is provided. The method includes copying data from the volatile memory to the non-volatile memory during a refresh cycle of the volatile memory and writing the data to one or more non-volatile memory cells within the non-volatile memory prior to a next refresh cycle of the volatile memory.

According to another embodiment, a memory system includes a volatile memory in a through-silicon via module, a non-volatile memory coupled to the volatile memory in the through-silicon via module, and backup control logic. The backup control logic is operable to copy data from the volatile memory to the non-volatile memory during a refresh cycle of the volatile memory and write the data to one or more non-volatile memory cells within the non-volatile memory prior to a next refresh cycle of the volatile memory.

According to yet another embodiment, a computer program product for data backup management between volatile memory and non-volatile memory in a through-silicon via module of a computer system is provided. The computer program product includes a computer readable storage medium having program instructions embodied therewith. The program instructions are executable by processing circuitry to cause the processing circuitry to copy data from the volatile memory to the non-volatile memory during a refresh cycle of the volatile memory and write the data to one or more non-volatile memory cells within the non-volatile memory prior to a next refresh cycle of the volatile memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to a computer memory system with a through-silicon via (TSV) module that includes volatile and non-volatile memory. The inclusion of TSVs enables connections between internal signal domains of the volatile and/or non-volatile memory that may not otherwise be accessible using only externally available signal connection points. TSVs in the volatile and non-volatile memory can be interconnected at various locations to enable data to be copied from the volatile memory to the non-volatile memory while the volatile memory is being refreshed. The volatile memory can include one or more dynamic random access memory (DRAM) chips, and the nonvolatile memory include one or more non-volatile random access memory (NVRAM) chips stacked with the DRAM in a TSV module.

By integrating the DRAM and NVRAM chips into one module and interacting with the data flow of the chips, backup storage of DRAM data to NVRAM can be achieved while maintaining the access times of the DRAM. In some embodiments, through TSV connections, sense amplifiers of the DRAM can be tied to sense amplifiers of the NVRAM such that data can be directly written from DRAM to NVRAM. Comparisons can also be performed in order to minimize the amount of write operations to the NVRAM when data is unchanged in the DRAM since the last refresh cycle.

In an embodiment, during a refresh of DRAM, data is read from a DRAM array. The data after a sense amplifier can then either be compared to the contents of the NVRAM and written if there is a change, or it can be written to NVRAM directly every time. Performing transfers to NVRAM during the refresh of the DRAM masks or greatly reduces the impact that the write latency of the NVRAM has on the performance of the system. Further, by performing the backup in real time, the data is constantly backed up. When powering the system back up, the contents of the NVRAM can be directly loaded into the DRAM array, resulting in a ready return to the last state of the DRAM array contents.

Figure 1:
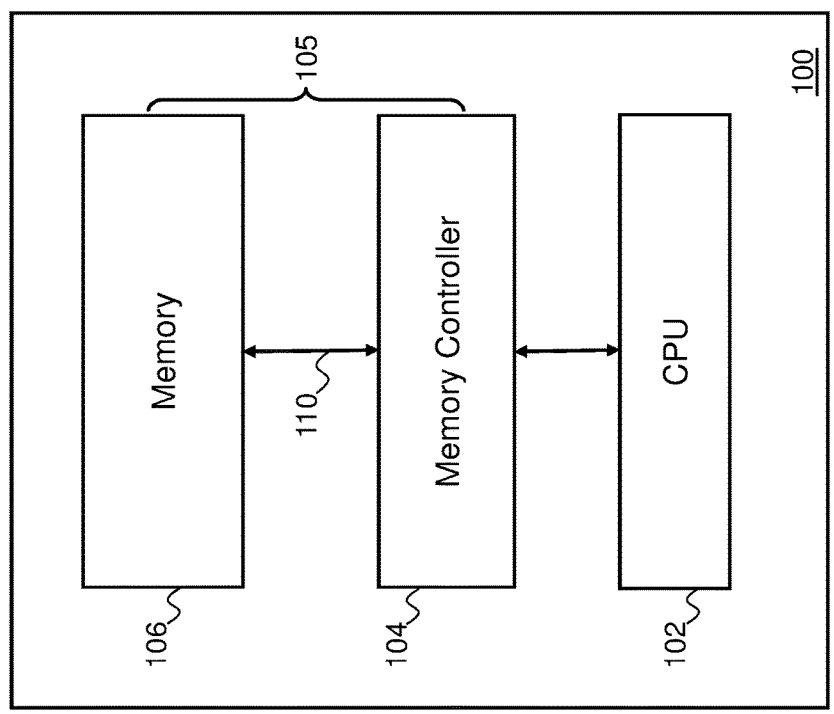
FIG. 1 is a block diagram of an exemplary system according to embodiments of the invention.

FIG. 1 illustrates a block diagram of a system 100, which is a computer system that supports data backup management in accordance with an embodiment. The system 100 depicted in FIG. 1 includes a computer processor 102, memory 106 including multiple memory devices, and a memory controller 104 for reading and storing data in the memory 106 via an interface 110. Collectively, the memory controller 104 and the memory 106 are referred to as a memory system 105. The computer processor 102 and the interface 110 may operate at different voltage levels and frequencies with respect to each other. The computer processor 102 can be a single core or multi-core processor, where each core may have different voltage and/or frequency settings.

In one embodiment the memory controller 104 is coupled to the computer processor 102 and receives read or write requests from the computer processor 102. The memory controller 104 can control signal timing and sequencing, including memory refresh commands on the interface 110.

The system 100 is one example of a configuration that may be utilized to perform the processing described herein. Although the system 100 has been depicted with only a memory 106, memory controller 104, and computer processor 102, it will be understood that other embodiments would also operate in other systems including additional elements, e.g., multiple computers processors 102 and multiple levels of memory 106. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
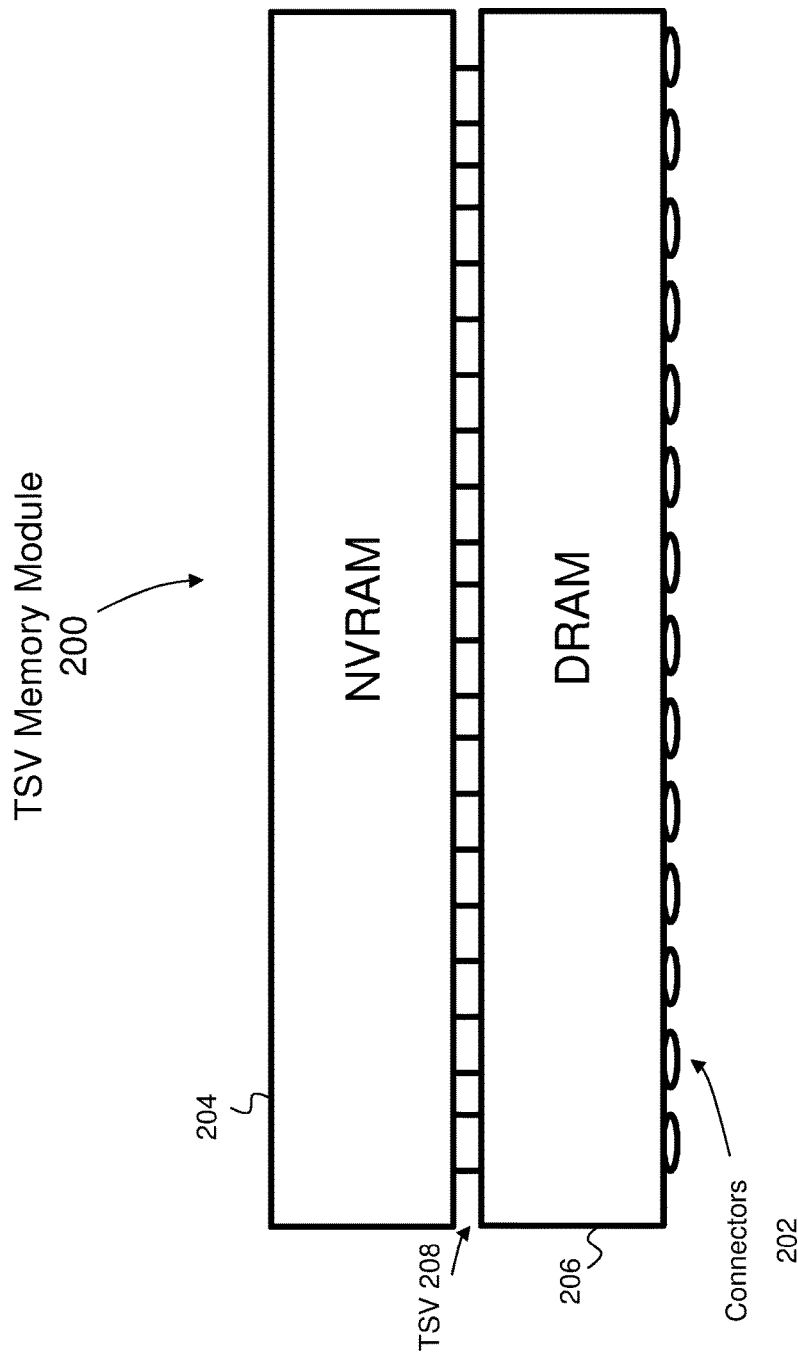
FIG. 2 is a block diagram of a memory device according to an embodiment of the invention.

FIG. 2 is a block diagram of a TSV memory module 200 of the memory 106 in memory system 105 of FIG. 1 according to an embodiment. Although only a single TSV memory module 200 is depicted in FIG. 2, it will be understood that the memory controller 104 can interface with multiple TSV memory modules 200, which may be organized in memory ranks, memory banks, memory cards, or the like. The interface 110 of FIG. 1 can be coupled to connectors 202 of the TSV memory module 200 to propagate power, control, address, and data signals between the memory controller 104 of FIG. 1 and the TSV memory module 200.

In the example of FIG. 2, an NVRAM 204 is a non-volatile memory that provides backup data storage for a DRAM 206. The DRAM 206 is a volatile memory that must be periodically refreshed to retain the state of a memory array within the DRAM 206. Memory refresh cycles can be controlled by the memory controller 104 of FIG. 1, or the DRAM 206 may support self-timed refreshes. In an alternate embodiment, control circuitry for initiating memory refreshes can be located elsewhere, such as a dedicated controller (not depicted) within the TSV memory module 200. TSVs 208 provide a signal path to support backup and restore operations between the NVRAM 204 and the DRAM 206.

Figure 3:
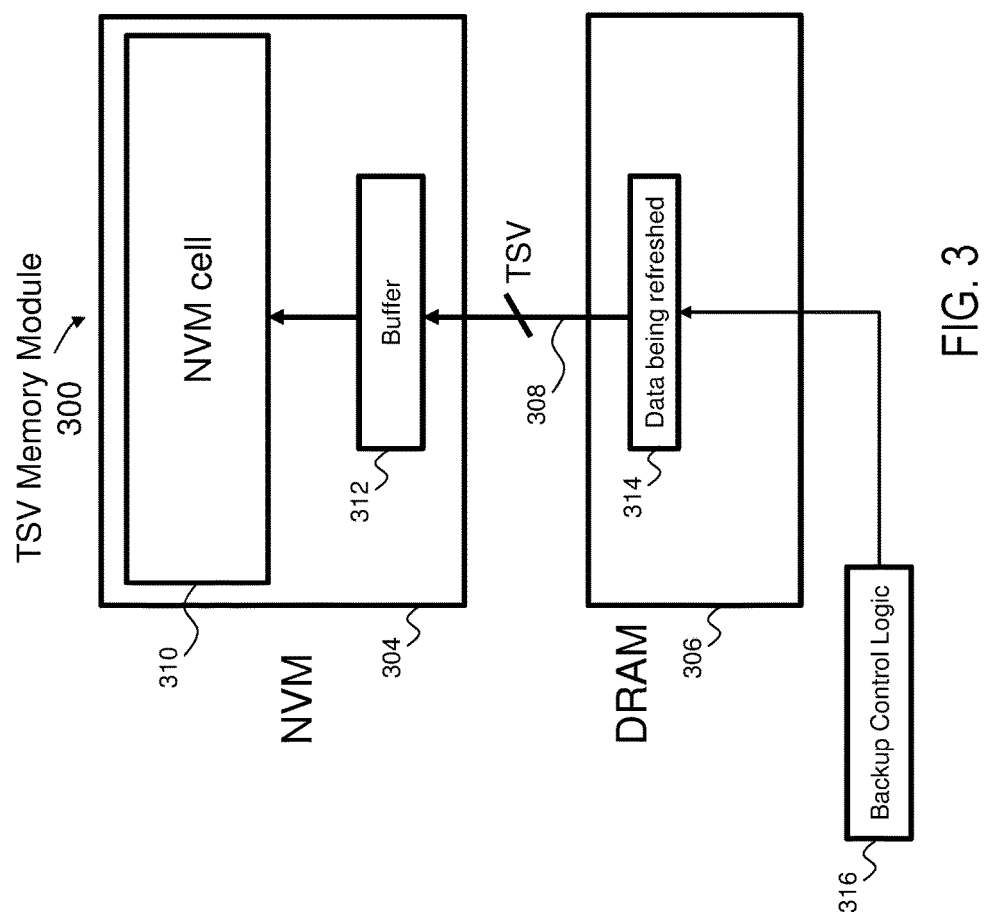
FIG. 3 is a block diagram of a memory device according to another embodiment of the invention.

FIG. 3 is another example of a TSV memory module 300, where non-volatile memory (NVM) 304 is coupled to DRAM 306 using TSVs 308 in a stacked package. The TSV memory module 300 is another example of memory 106 in the memory system 105 of FIG. 1. The NVM 304 can be any type of non-volatile memory that includes a plurality of NVM cells 310 that retain state values upon a loss of power. In contrast, the contents of DRAM 306 are not retained when power is lost. In some embodiments, the TSV memory module 300 includes a buffer 312 that temporarily stores a copy of data being refreshed 314 from DRAM 306. The buffer 312 can be implemented using latches, a register array, dynamic RAM and/or static RAM. The buffer 312 can be sized to match an expected size of the data being refreshed 314. Data captured in the buffer 312 is written to one or more of the NVM cells 310 between refresh cycles of the DRAM 306 while contents of the DRAM 306 is being accessed or updated by the memory controller 104 of FIG. 1.

Backup control logic 316 can be embodied in processing circuitry in the memory controller 104 and/or as part of the TSV memory module 300 to control copying of the data being refreshed 314 from DRAM 306 to NVM 304 during a refresh cycle. The backup control logic 316 may also control the writing of data from the buffer 312 to one or more NVM cells 310. As part of the copying and writing of data from DRAM 306 to NVM 304, the backup control logic 316 may perform comparisons between the contents of the one or more NVM cells 310 and the data being refreshed 314 (e.g., as captured in buffer 312) and only make updates to the one or more NVM cells 310 if a difference is detected. Although depicted as a single block, the backup control logic 316 can be distributed between multiple locations, e.g., partially implemented within the memory controller 104, NVM 304, DRAM 306, and/or elsewhere within system 100 of FIG. 1.

Figure 4:
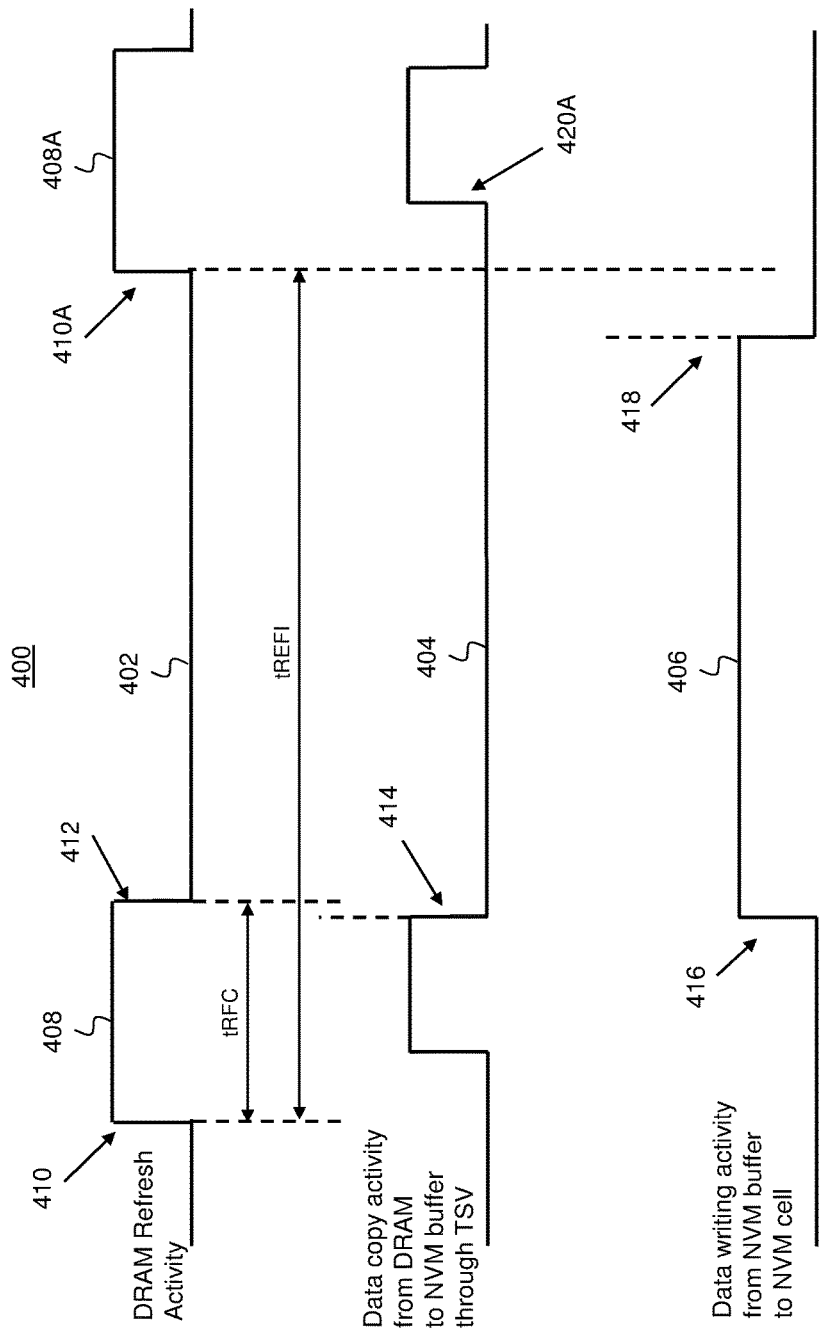
FIG. 4 is an example of a timing diagram according to an embodiment of the invention.

FIG. 4 is a timing diagram 400 according to an embodiment in further reference to FIG. 3. The example of FIG. 4 illustrates refresh activity timing 402 for DRAM 306 relative to data copying activity 404 from DRAM 306 to NVM buffer 312 through TSVs 308. The timing diagram 400 also depicts data writing activity 406 from NVM buffer 312 to one or more NVM cells 310. A refresh cycle 408 can be defined between refresh start 410 and refresh end 412 over a refresh cycle time (tRFC). A refresh time interval (tREFI) is defined between refresh start 410 of refresh cycle 408 and refresh time start 410A of a next refresh cycle 408A. The data copying activity 404 is active during the refresh cycle 408 and may reach copy completion 414 prior to the refresh end 412. The DRAM 306 is deemed busy during the refresh cycle 408 and cannot be written to by the memory controller 104 of FIG. 1 during that period. Between the refresh end 412 and the refresh time start 410A of the next refresh cycle 408A, the memory controller 104 can read and/or write to the DRAM 306. The copy completion 414 can also coincide with starting 416 of data writing activity 406. Alternatively, the data writing activity 406 may start prior to copy completion 414 once a portion of the data being refreshed 314 is available in the buffer 312. Data writing activity 406 can reach write completion 418 prior to the refresh time start 410A of the next refresh cycle 408A. Alternatively, write completion 418 may extend past the refresh time start 410A of the next refresh cycle 408A but occur prior to a next copy start 420A.

Figure 5:
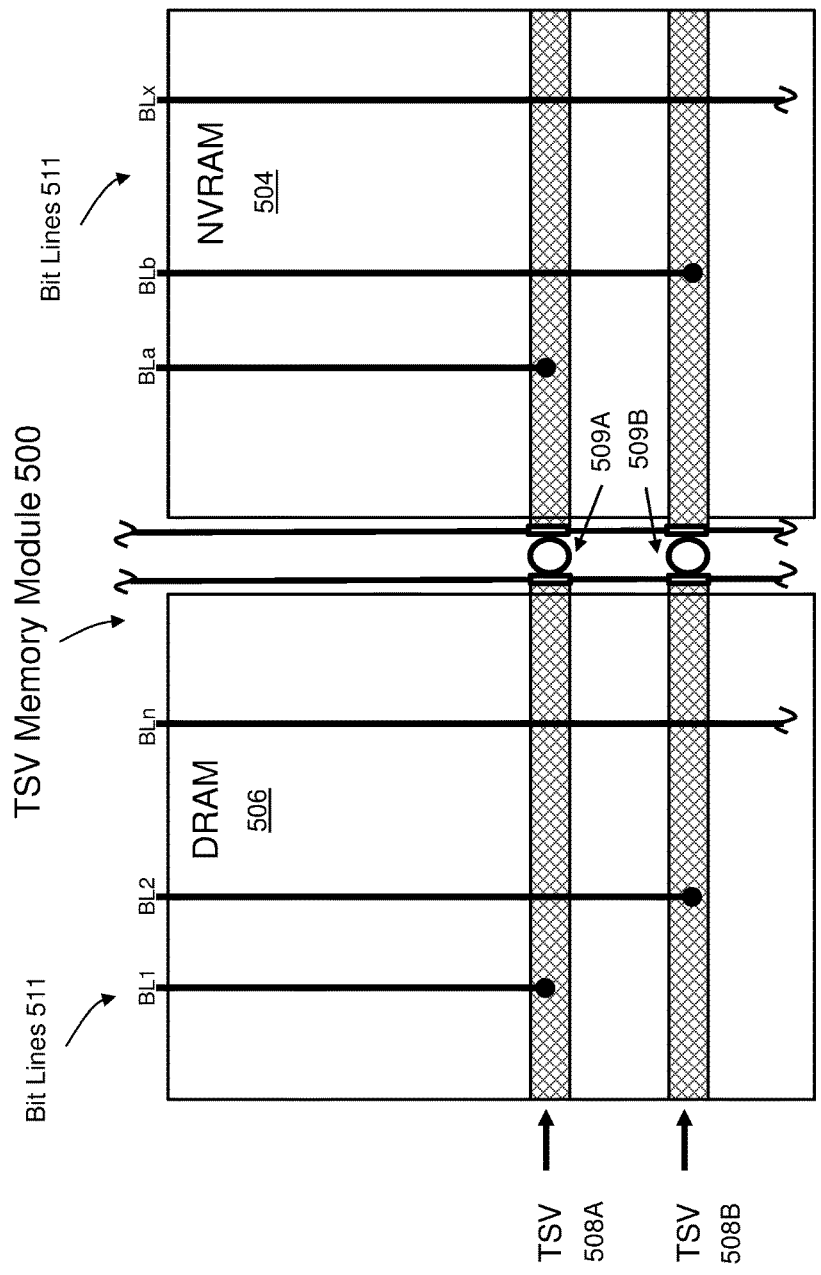
FIG. 5 is a block diagram of a memory device according to another embodiment of the invention.

TSV memory module 500 of FIG. 5 is another example of memory 106 in the memory system 105 of FIG. 1. In FIG. 5, TSVs 508 connect DRAM 506 and NVRAM 504 directly between bit lines 511 of the DRAM 506 and NVRAM 504. The two different memory types (volatile and non-volatile) are connected using interconnects 509 between respective TSVs 508 of the DRAM 506 and NVRAM 504. Within each memory chip (NVRAM 504 and DRAM 506), multiple bit lines (BLs) 511 can be connected to the respective TSVs 508. For example, data from bit line BL1 of DRAM 506 can be transferred to bit line BLa of NVRAM 504 through TSV 508A and interconnect 509A. Similarly, data from bit line BL2 of DRAM 506 can be transferred to bit line BLb of NVRAM 504 through TSV 508B and interconnect 509B. Although not depicted in FIG. 5, it will be understood that the TSV memory module 500 can include numerous other elements, such as buffers, memory cells, and/or backup control logic, as well as other memory elements known in the art.

Figure 6:
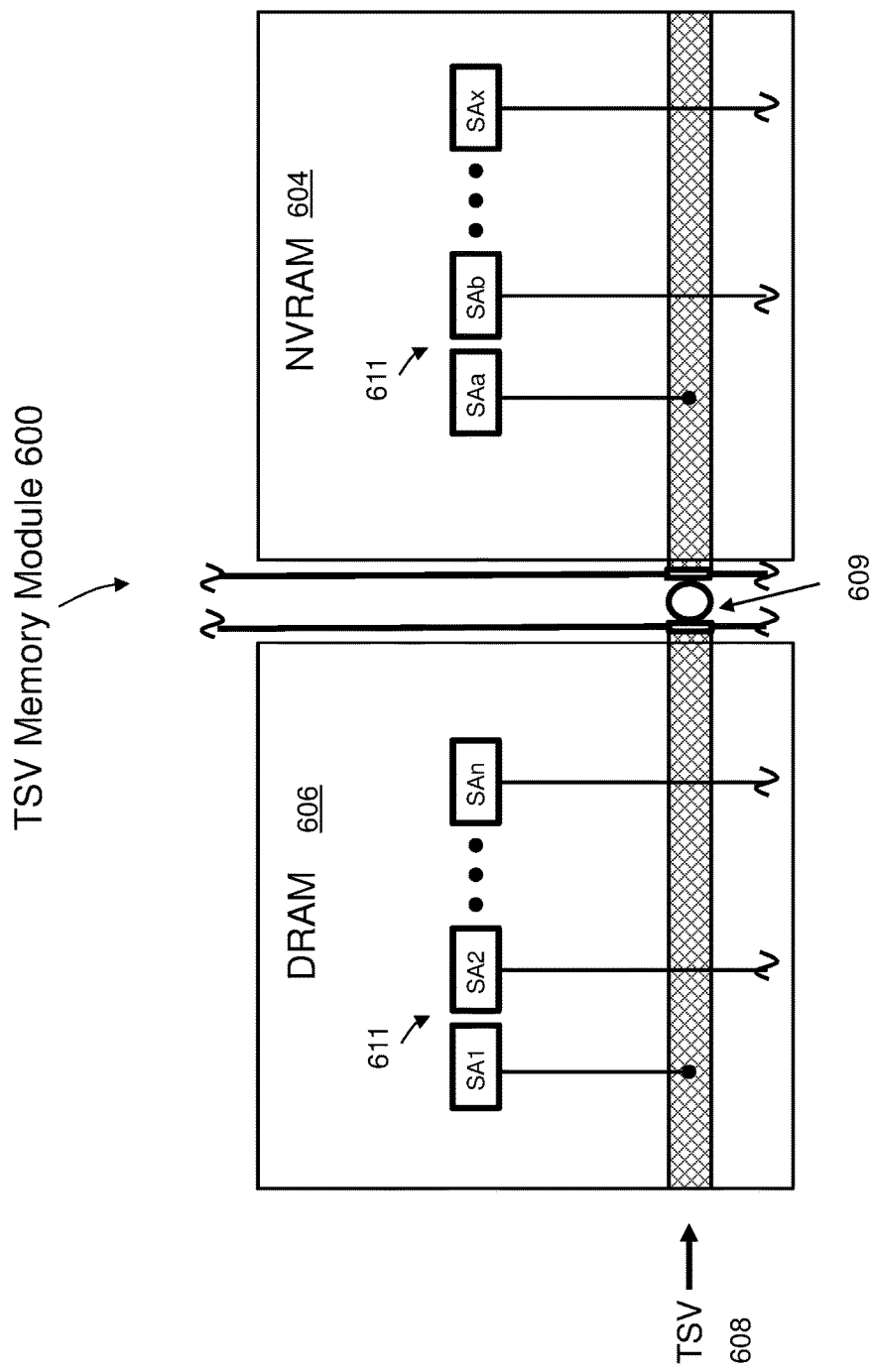
FIG. 6 is a block diagram of a memory device according to another embodiment of the invention.

TSV memory module 600 of FIG. 6 is another example of memory 106 in the memory system 105 of FIG. 1. In FIG. 6, TSVs 608 connect DRAM 606 and NVRAM 604 directly between sense amplifiers (SA1-SAn and SAa-SAx) 611. The two different memory types (volatile and non-volatile) are connected using interconnects 609 between respective TSVs 608 of the DRAM 606 and NVRAM 604. Within each memory chip (NVRAM 604 and DRAM 606), multiple sense amplifiers 611 are connected to TSVs 608, thereby reducing the number of TSV 608 needed over a direct 1:1 implementation. Sense amplifiers 611 sharing a TSV 608 do not have overlapping array accesses. At any given time only one of the sense amplifiers 611 has electrical control over the TSV 608 that it is connected to and can be controlled by the sense amplifier 611 to TSV 608 connect architecture. Although not depicted in FIG. 6, it will be understood that the TSV memory module 600 can include numerous other elements, such as buffers, memory cells, and/or backup control logic, as well as other memory elements known in the art.

Figure 7:
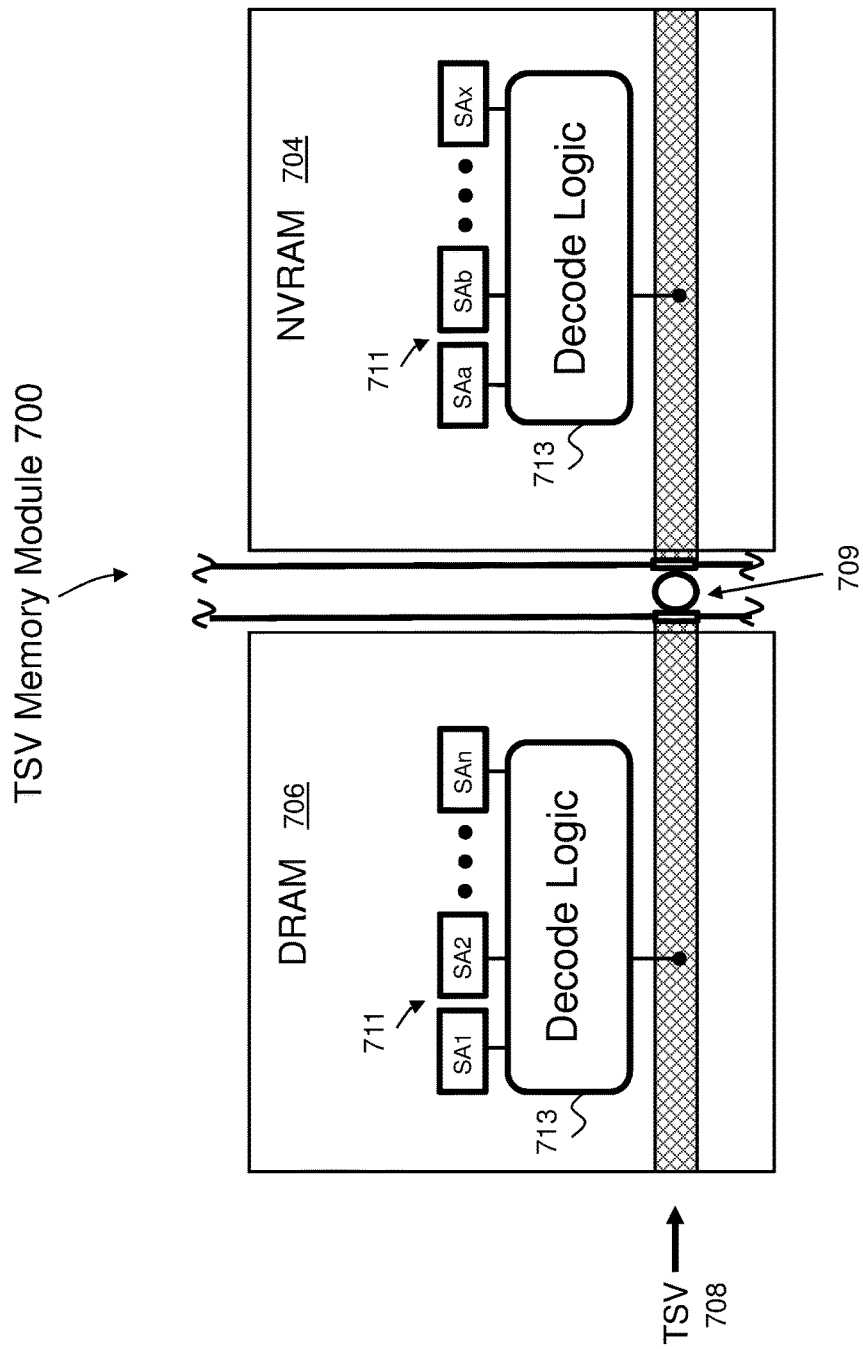
FIG. 7 is a block diagram of a memory device according to another embodiment of the invention.

TSV memory module 700 of FIG. 7 is another example of memory 106 in the memory system 105 of FIG. 1. In FIG. 7, TSVs 708 connect DRAM 706 and NVRAM 704 directly between decode logic 713. The two different memory types (volatile and non-volatile) are connected using interconnects 709 between respective TSVs 708 of the DRAM 706 and NVRAM 704. Within each memory chip (NVRAM 704 and DRAM 706), multiple sense amplifiers (SA1-SAn and SAa-SAx) 711 are connected to decode logic 713 that controls which sense amplifier 711 has electrical control over a given TSV 708. In this manner, the number of required TSVs 708 can be greatly reduced over other embodiments. Although not depicted in FIG. 7, it will be understood that the TSV memory module 700 can include numerous other elements, such as buffers, memory cells, and/or backup control logic, as well as other memory elements known in the art.

Figure 8:
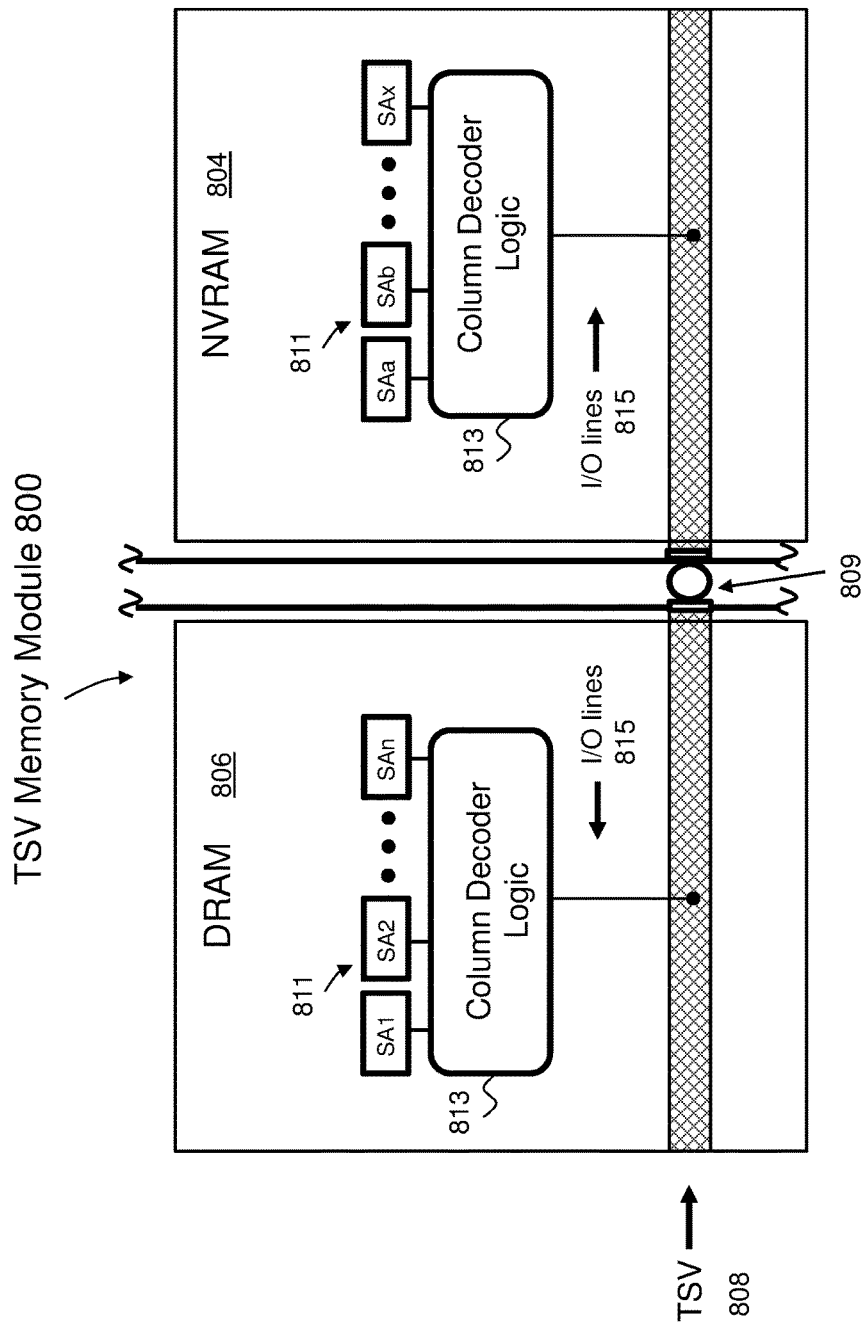
FIG. 8 is a block diagram of a memory device according to another embodiment of the invention.

TSV memory module 800 of FIG. 8 is another example of memory 106 in the memory system 105 of FIG. 1. In FIG. 8, TSVs 808 connect DRAM 806 and NVRAM 804 using existing column decoder logic 813 to existing input/output (I/O) lines 815. The two different memory types (volatile and non-volatile) are connected using interconnects 809 between respective TSVs 808 of the DRAM 806 and NVRAM 804. Within each memory chip (NVRAM 804 and DRAM 806), multiple sense amplifiers (SA1-SAn and SAa-SAx) 811 are connected to column decoder logic 813 that controls which sense amplifier 811 has electrical control over a given TSV 808. By connecting shared TSVs 808 to existing I/O lines 815 coming out of the column decoder logic 813, there is no data contention across TSVs 808. Although not depicted in FIG. 8, it will be understood that the TSV memory module 800 can include numerous other elements, such as buffers, memory cells, and/or backup control logic, as well as other memory elements known in the art.

Figure 9:
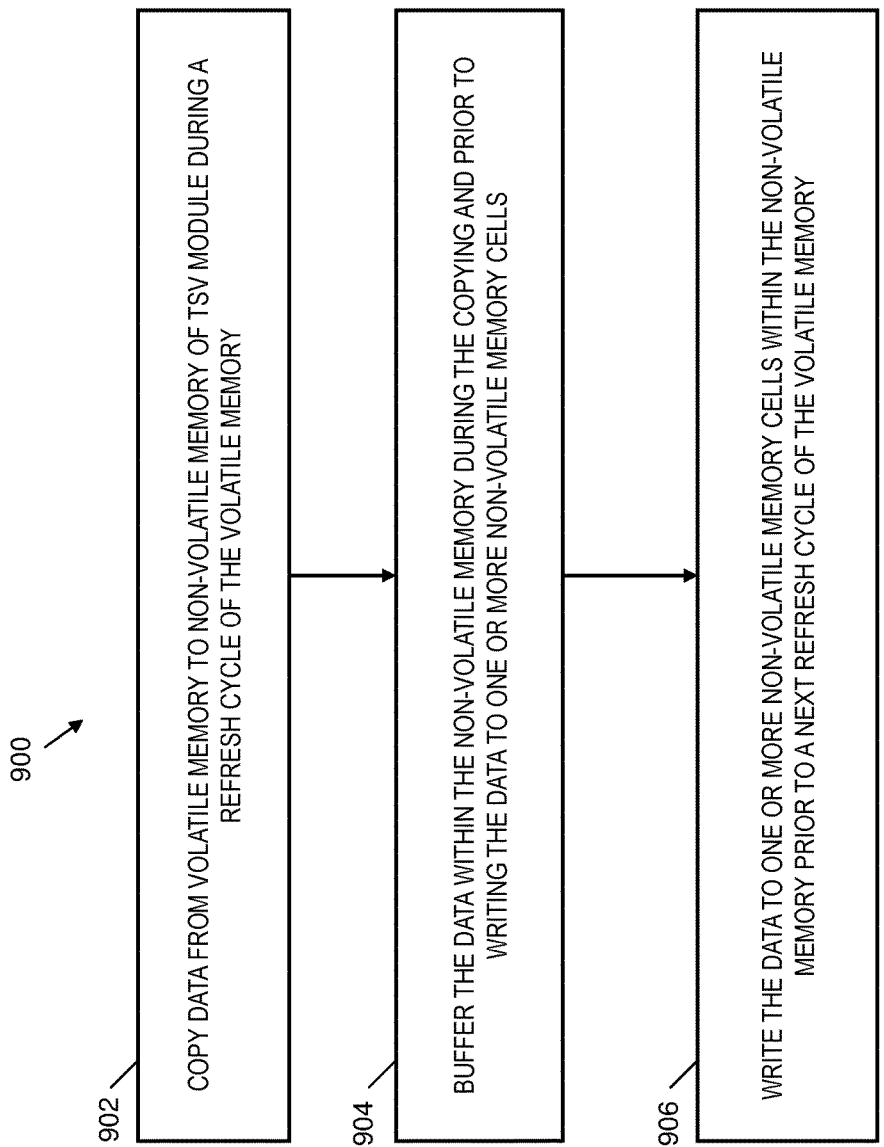
FIG. 9 is a process flow according to an embodiment of the invention.

FIG. 9 is a process flow of a method 900 according to an embodiment. The method 900 can be performed by various elements of the system 100 of FIG. 1, such as the memory system 105 of FIG. 1, and is described in reference to FIGS. 1-8. Although a particular order of blocks is depicted and described with respect to FIG. 9, it will be understood that the order can be changed, and the blocks may be combined or further subdivided. For purposes of explanation, the method 900 is described with respect to the TSV memory module 300 of FIG. 3 and timing diagram 400 of FIG. 4 but can be implemented in any of the TSV memory module configurations as described herein.

At block 902, data (e.g., data being refreshed 314) is copied from volatile memory (DRAM 306) to the NVM 304 during a refresh cycle 408 of the volatile memory. Copying of data can be controlled by the backup control logic 316 in real time while refresh cycle 408 is active. Copying of the data from the DRAM 306 to the NVM 304 can be performed by transferring the data across a plurality of TSVs 308 interconnected between the DRAM 306 and the NVM 304 within the TSV memory module 300.

At block 904, during copying from the DRAM 306 to NVM 304, data can be held in buffer 312 prior to writing the data to one or more NVM cells 310. The buffer 312 can also be used to determine whether the contents of the one or more NVM cells 310 already match the data being refreshed 314, e.g., by comparing the contents of the one or more NVM cells 310 prior to writing from the buffer 312 to the one or more NVM cells 310.

At block 906, the data is written to one or more NVM cells 310 within the NVM 304 prior to a next refresh cycle 408A of the DRAM 306. Using the buffer 312 provides margin for slower write timing of the NVM cells 310 to be accommodated while also keeping the DRAM 306 available to read/write requests from the memory controller 104 during non-refresh times.

Technical effects and benefits include masking transfers of data from DRAM to NVRAM during the refresh cycle of the DRAM. Persistence of DRAM array contents can be achieved without directly experiencing the typical performance limitations of NVRAM. The need for a backup power supply for memory persistence can be eliminated or significantly reduced in some embodiments by performing backup operations in real time, and thus may provide a more reliable and less complicated solution.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of data backup management between a volatile memory and a non-volatile memory in a through-silicon via module of a computer system, the method comprising:

copying data from the volatile memory to the non-volatile memory during a refresh cycle that refreshes the data in the volatile memory by transferring the data through one or more through-silicon vias within the volatile memory to one or more through-silicon vias within the non-volatile memory, wherein the one or more through-silicon vias within the volatile memory are connected to the one or more through-silicon vias within the non-volatile memory by one or more interconnects that are external to the volatile memory and the non-volatile memory;

buffering the data in a buffer comprising a temporary storage area within the non-volatile memory during the copying;

comparing the data in the buffer to one or more non-volatile memory cells prior to writing the data to the one or more non-volatile memory cells; and writing the data to the one or more non-volatile memory cells within the non-volatile memory prior to a next refresh cycle of the volatile memory based on detecting a difference between the one or more non-volatile memory cells and the data in the buffer.

2. The method according to claim 1, wherein the one or more through-silicon vias are shared between bit lines of the volatile memory and the non-volatile memory.

3. The method according to claim 1, wherein the one or more through-silicon vias are shared between sense amplifiers of the volatile memory and the non-volatile memory.

4. The method according to claim 1, wherein the one or more through-silicon vias are shared between decode logic of the volatile memory and the non-volatile memory.

5. The method according to claim 1, wherein the one or more through-silicon vias are shared between input/output lines of the volatile memory and the non-volatile memory.

6. The method according to claim 1, wherein the volatile memory is dynamic random access memory, the non-volatile memory is non-volatile random access memory, and the through-silicon via module comprises a stacked package connecting a plurality of through-silicon vias between the volatile memory and the non-volatile memory.

7. The method of claim 1, wherein the through-silicon via module comprises a plurality of connectors that propagate a plurality of signals between a memory controller and the one or more through-silicon vias of the volatile memory and through the one or more interconnectors to the one or more through-silicon vias of the non-volatile memory.

8. A memory system comprising:

a volatile memory in a through-silicon via module comprising one or more through-silicon vias within the volatile memory;

a non-volatile memory coupled to the volatile memory in the through-silicon via module comprising one or more through-silicon vias within the non-volatile memory, wherein the one or more through-silicon vias within the volatile memory are connected to the one or more through-silicon vias within the non-volatile memory by one or more interconnects that are external to the volatile memory and the non-volatile memory;

a buffer comprising a temporary storage area within the non-volatile memory to hold data during copying from the volatile memory and prior to writing the data to one or more non-volatile memory cells; and backup control logic operable to copy the data from the volatile memory to the non-volatile memory during a refresh cycle that refreshes the data in the volatile memory and write the data to the one or more non-volatile memory cells within the non-volatile memory prior to a next refresh cycle of the volatile memory based on detecting a difference between the one or more non-volatile memory cells and the data in the buffer.

9. The memory system according to claim 8, wherein the one or more through-silicon vias are shared between bit lines of the volatile memory and the non-volatile memory.

10. The memory system according to claim 8, wherein the one or more through-silicon vias are shared between sense amplifiers of the volatile memory and the non-volatile memory.

11. The memory system according to claim 8, wherein the one or more through-silicon vias are shared between decode logic of the volatile memory and the non-volatile memory.

12. The memory system according to claim 8, wherein the one or more through-silicon vias are shared between input/output lines of the volatile memory and the non-volatile memory.

13. The memory system according to claim 8, wherein the volatile memory is dynamic random access memory, the non-volatile memory is non-volatile random access memory, and the through-silicon via module comprises a stacked package connecting a plurality of through-silicon vias between the volatile memory and the non-volatile memory.

14. The memory system of claim 8, wherein the through-silicon via module comprises a plurality of connectors that propagate a plurality of signals between a memory controller and the one or more through-silicon vias of the volatile memory and the one or more interconnectors to the one or more through-silicon vias of the non-volatile memory.

15. A computer program product for data backup management between volatile memory and non-volatile memory in a through-silicon via module of a computer system, the computer program product comprising a computer readable storage medium having program instructions embodied therewith, the program instructions executable by processing circuitry to cause the processing circuitry to:

copy data from the volatile memory to the non-volatile memory during a refresh cycle that refreshes the data in the volatile memory by transferring the data through one or more through-silicon vias within the volatile memory to one or more through-silicon vias within the non-volatile memory, wherein the one or more through-silicon vias within the volatile memory are connected to the one or more through-silicon vias within the non-volatile memory by one or more interconnects that are external to the volatile memory and the non-volatile memory;

buffer the data in a buffer comprising a temporary storage area within the non-volatile memory during the copying;

compare the data in the buffer to one or more non-volatile memory cells prior to writing the data to the one or more non-volatile memory cells; and write the data to the one or more non-volatile memory cells within the non-volatile memory prior to a next refresh cycle of the volatile memory based on detecting a difference between the one or more non-volatile memory cells and the data in the buffer.

16. The computer program product according to claim 15, wherein the volatile memory is dynamic random access memory, the non-volatile memory is non-volatile random access memory, and the through-silicon via module comprises a stacked package connecting a plurality of through-silicon vias between the volatile memory and the non-volatile memory.

17. The computer program product of claim 15, wherein the through-silicon via module comprises a plurality of connectors that propagate a plurality of signals between a memory controller and the one or more through-silicon vias of the volatile memory and through the one or more interconnectors to the one or more through-silicon vias of the non-volatile memory.

\* \* \* \* \*